June 6, 1950     L. F. BLATT     2,510,371
FISH SCALER

Filed March 31, 1947

INVENTOR.
LELAND F. BLATT
BY
*J. S. Murray*
ATTORNEY

Patented June 6, 1950

2,510,371

UNITED STATES PATENT OFFICE 2,510,371

FISH SCALER

Leland F. Blatt, Detroit, Mich.

Application March 31, 1947, Serial No. 738,354

6 Claims. (Cl. 17—7)

This invention relates to fish scalers and has for its object the provision of a simple and inexpensive device for scraping the scales from a fish, such device being suited to either right-hand or left-hand use and having its scraper sufficiently enclosed to prevent the scales from being scattered.

This and various other objects are attained by the construction hereinafter described and illustrated in the accompanying drawing, wherein.

Figure 1:
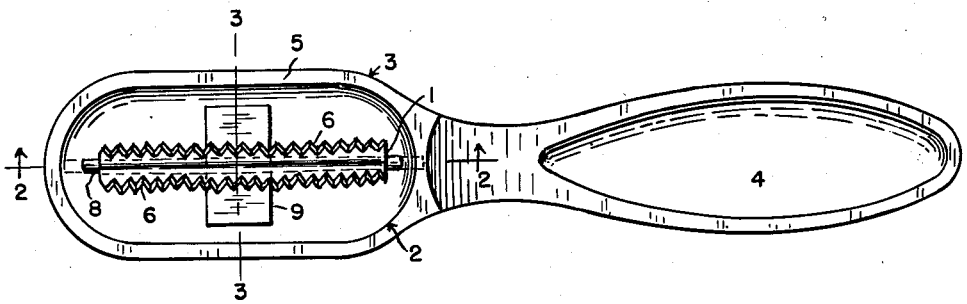
Fig. 1 is a bottom plan view of my improved fish scaler.
Figure 2:
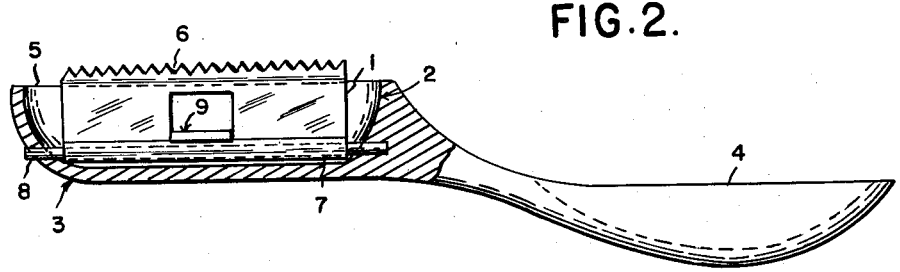
Fig. 2 is a side elevational view partially in section on the line 2—2 of Fig. 1.
Figure 3:
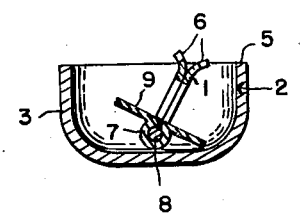
Fig. 3 is a cross sectional view on the line 3—3 of Fig. 1.

In these views, the reference character 1 designates a scraper mounted within an elongated approximately oval chamber 2 formed in a head 3 terminally and integrally carried by a handle 4. Said head has a plane face 5 in which the chamber 2 opens, and the scaper has two serrated margins 6 which project from the chamber 2 slightly beyond said plane face. It is preferred to form the scraper of a substantially rectangular metal sheet medially folded on itself and expanded at its fold to form a sleeve 7 remote from said serrated edges. The duplicate halves of the scraper contiguously extend from the sleeve 7 but have a slight divergency at their serrated edges. A pin 8 is pressed into the sleeve 7 and its ends are so journaled in the ends of the head 3 as to locate said sleeve in close proximity to the bottom of the chamber 2. Thus the scraper may rock laterally on the pin 8 to establish either of its serrated margins in a projecting relation to the head 3, such rocking being limited by a pair of lugs 9, struck out of the halves of the scraper and projecting laterally for limiting contact with the bottom of the chamber 2, as best appears in Fig. 3.

Because of its dual serrated edges and its rocking movement the described device serves equally well for fish scaling, whether operated by a right-handed or left-handed person. The plane face 5 either contacts the surface to be scaled or is in such close proximity to such surface as to confine the released scales so that the latter may not scatter. The dual serrated edges also increase the useful life of the device.

What I claim is:

1. A fish scaler comprising an elongated head formed with a chamber opening in a face of said head, a scraper within said chamber and having a serrated margin, and means pivoting said scraper on the head to rock about an axis extending lengthwise of said head, the head coacting with the scraper to limit its rocking travel in both directions and said serrated margin being exposed beyond the head at one limit of such travel and lying substantially within said chamber at the other limit of such travel.

2. In a fish scaler as set forth in claim 1, opposite lateral projections on the scraper for interior engagement with the head to limit rocking of the scraper.

3. A fish scaler comprising an elongated head formed with a chamber opening in a face of said head, a scraper within said chamber formed by a sheet of metal medially folded on itself and forming a sleeve at its fold, the margins of said scraper remote from said sleeve being serrated and slightly diverged, and a pin engaging in said sleeve and pivoting the scraper on the head, said head coacting with the scraper to establish opposite limits for rocking travel on said pin and said serrated margins respectively projecting beyond said chamber at the respective limits of said rocking travel.

4. A fish scaler as set forth in claim 3, said scraper having struck-out, laterally projecting lugs for interiorly engaging the head to limit said rocking travel.

5. A scraper comprising a sheet of material having parallel integral plies and forming a sleeve at the juncture of said plies and having its dual margins remote from said sleeve diverged and serrated.

6. A fish scaler comprising an elongated head formed with a chamber opening in a face of said head, a scraper within and elongated lengthwise of said chamber and formed by two blades occupying a side by side relation, means pivoting said scraper on the head to rock about an axis substantially parallel and adjacent to the bottom of said chamber, said blades having divergent serrated margins remote from said axis, adapted to each swing into and out of said chamber through rocking of the scraper, and a pair of stops carried by and oppositely laterally projecting from the scraper, and alternatively engageable with the bottom of said chamber to establish the respective effective projecting positions of said serrated margins.

LELAND F. BLATT.

REFERENCES CITED

The following references are of record in the file of this patent:

UNITED STATES PATENTS

| Number | Name | Date |
|---|---|---|
| 152,290 | Hutchins | June 23, 1874 |
| 787,037 | Hackett et al. | Apr. 11, 1905 |
| 1,236,369 | Easby et al. | Aug. 7, 1917 |